United States Patent
Jos et al.

(10) Patent No.: US 10,461,982 B2
(45) Date of Patent: Oct. 29, 2019

(54) METHOD FOR ESTIMATING CARRIER FREQUENCY OFFSET WITH TIMING SYNCHRONIZATION IN WIRELESS RECEIVER

(71) Applicant: SAMSUNG ELECTRONICS CO., LTD., Suwon-si (KR)

(72) Inventors: Sujit Jos, Bangalore (IN); Kiran Bynam, Karnataka (IN); Chang Soon Park, Chungju-si (KR); Jinesh Parameshwaran Nair, Bangalore (IN); Chandrashekhar Thejaswi Pattaguppe Suryanarayan Bhat, Bangalore (IN); Young Jun Hong, Seoul (KR); Young Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/876,948

(22) Filed: Jan. 22, 2018

(65) Prior Publication Data

US 2018/0331874 A1    Nov. 15, 2018

(30) Foreign Application Priority Data

May 15, 2017    (IN) .............................. 201741016988

(51) Int. Cl.
*H04L 27/26*    (2006.01)
*H04L 7/04*     (2006.01)
*H04L 7/10*     (2006.01)

(52) U.S. Cl.
CPC ...... *H04L 27/2659* (2013.01); *H04L 27/2613* (2013.01); *H04L 27/2662* (2013.01); *H04L 7/042* (2013.01); *H04L 7/10* (2013.01); *H04L 27/2675* (2013.01); *H04L 27/2685* (2013.01); *H04L 27/2686* (2013.01)

(58) Field of Classification Search
CPC .................................................. H04L 27/2659
USPC ........................................................ 375/260
See application file for complete search history.

(56) References Cited

U.S. PATENT DOCUMENTS

| 7,039,131 | B2 | 5/2006 | Banerjea | |
|---|---|---|---|---|
| 7,227,835 | B2 | 6/2007 | Belotserkovsky et al. | |
| 8,265,184 | B2 | 9/2012 | Li et al. | |
| 8,611,472 | B2 | 12/2013 | Mishra et al. | |
| 2004/0156309 | A1* | 8/2004 | Chadha | H04L 27/2675 370/208 |
| 2007/0140366 | A1* | 6/2007 | Rore | H04L 27/2657 375/260 |

(Continued)

FOREIGN PATENT DOCUMENTS

WO    2004/014008 A2    2/2004

*Primary Examiner* — Lihong Yu
(74) *Attorney, Agent, or Firm* — Sughrue Mion, PLLC (57) ABSTRACT

A method and apparatus estimating carrier frequency offset (CFO) with timing synchronization are provided. The apparatus includes processor that receives analog-to-digital converter (ADC) samples, determines a coarse angle from the received ADC samples, obtains an improved coarse angle by altering the coarse angle based on a preamble duration, determines a base CFO estimate from the improved coarse angle and determines a plurality of candidate CFOs based on the base CFO estimate and a difference frequency.

16 Claims, 5 Drawing Sheets

(56) References Cited

U.S. PATENT DOCUMENTS

2007/0297535 A1* 12/2007 Taniguchi ............... G01D 1/16
　　　　　　　　　　　　　　　　　　　　　375/316
2011/0116562 A1*  5/2011 Li ..................... H04L 27/0014
　　　　　　　　　　　　　　　　　　　　　375/260

* cited by examiner

METHOD FOR ESTIMATING CARRIER FREQUENCY OFFSET WITH TIMING SYNCHRONIZATION IN WIRELESS RECEIVER

CROSS-REFERENCE TO RELATED APPLICATIONS

This application claims priority from Indian Patent Application No. 201741016988, filed on May 15, 2017 in the Indian Patent Office, the disclosure of which is incorporated herein by reference in its entirety.

BACKGROUND

Field

Example embodiments herein relate to wireless communication receivers, and more particularly, to a method for estimating carrier frequency offset with timing synchronization in a wireless receiver.

Description of the Related Art

In related art, digital communication receivers widely used in modern communication systems, the digital communication receivers require a considerable level of complexity in order to be able to handle signal distortion, such as multi-path propagation, and still be able to decode data transmitted from a digital communication transmitter.

In the related art digital communication systems, there are undesired offsets, which include carrier frequency offsets (CFOs) and sampling frequency offsets. The CFOs result in the received signal being demodulated by a wrong carrier frequency, while sampling frequency offsets result in the data being sampled at the wrong time instants. In the related art, such frequency offsets are only detected and corrected during processing at the receiver. For example, the receiver can employ a carrier frequency lock loop to determine the CFO. In the related art systems, the CFO is estimated by using a time domain based estimation followed by a Phase Lock Loop (PLL).

In order to compensate for the undesirable effects of CFO error, the wireless local area network (WLAN) standard provides short and long training symbols to estimate the CFO. In the related art systems, the CFO estimation relies on identifying a period in a received signal preamble sequence, which is specific to the standard. However, the period may not be sufficient to estimate the CFO in the range specified by the standard. For example, the IEEE 802.15.4q preamble can estimate the CFO's within range of $[-15.625$ KHZ to $+15.625$ KHZ] corresponding to angle range $[-\pi$ to $+\pi]$. At certain instances, the range of the CFO to be estimated may be beyond the time period of corresponding preamble.

After estimating and compensating the CFO, the receiver performs timing synchronization. During timing synchronization, the receiver identifies the start of valid data in a stream of received bits of information. This information is required to separate the payload data from header information. The timing synchronization is performed by correlation with a known sequence referred to as preamble, which is included at the time of transmission.

SUMMARY

One or more example embodiments may overcome the above described disadvantages and other disadvantages not described above. Also, the one or more example embodiments are not required to overcome the disadvantages described above, and may not overcome any of the problems described above.

According to an aspect of an example embodiment, there is provided a method for estimating carrier frequency offset (CFO) with timing synchronization in a wireless receiver, the method including: receiving analog-to-digital converter (ADC) samples, determining a coarse angle from the received ADC samples, obtaining an improved coarse angle by altering the coarse angle based on a preamble duration, determining a base CFO estimate from the improved coarse angle, determining a plurality of candidate CFOs based on the base CFO estimate and a difference frequency and determining the CFO and the timing synchronization using the plurality of candidate CFOs.

The coarse angle may be determined based on an angle between two ADC samples separated by a predetermined time duration.

The preamble duration may be a predefined value.

The difference frequency may be a reciprocal of a product of a preamble period and a sampling period.

The determining the CFO and the timing synchronization using the plurality of candidate CFOs may include: obtaining a plurality of compensated ADC samples corresponding to the plurality of candidate CFOs, after compensating the received ADC samples with the plurality of candidate CFOs, performing a sliding window correlation for each of the plurality of compensated ADC samples with a oversampled preamble sequence and determining a maximum correlation value among correlation values in the sliding window correlation for each of the plurality of compensated ADC samples.

A candidate CFO, among the plurality of candidate CFOs, having the maximum correlation value may be estimated as the CFO.

A time instance at which the maximum correlation value is obtained may be determined as the timing synchronization.

According to an aspect of another example embodiment, there is provided an apparatus including a processor configured to: receive analog-to-digital converter (ADC) samples, determine a coarse angle from the received ADC samples, obtain an improved coarse angle by altering the coarse angle based on a preamble duration, compute a base CFO estimate from the improved coarse angle, determine a plurality of candidate CFOs based on the base CFO estimate and a difference frequency and determine a CFO and a timing synchronization using the plurality of candidate CFOs.

The processor may be further configured to determine the coarse angle based on an angle between two ADC samples separated by a predetermined time duration.

The preamble duration may be a predefined value.

The difference frequency may be a reciprocal of a product of a preamble period and a sampling period.

The processor may be further configured to estimate the CFO and the timing synchronization using the plurality of candidate CFOs by: obtaining a plurality of compensated ADC samples corresponding to the plurality of candidate CFOs, after compensating the received ADC samples with the plurality of candidate CFOs; performing a sliding window correlation for each of the plurality of compensated ADC samples with a oversampled preamble sequence; and determining a maximum correlation value among all correlation values in the sliding window correlation for each of the plurality of compensated ADC samples.

A candidate CFO, among the plurality of candidate CFOs, having the maximum correlation value may be estimated as the CFO.

A time instance at which the maximum correlation value is obtained may be determined as the timing synchronization.

According to an aspect of another example embodiment, there is provided an apparatus including: a processor configured to: determine an estimated base carrier frequency offset (CFO) based on an angle between analog-to-digital converter (ADC) samples and a preamble duration, determine a plurality of candidate CFOs based on the estimated base CFO and a difference frequency and determine a CFO from the plurality of candidate CFOs based on a correlation value corresponding to each of the plurality of candidate CFOs.

Unlike related art systems, the methods and apparatuses according one or more example embodiments of the disclosure may estimate the CFO and timing synchronization jointly. The methods and apparatuses according one or more example embodiments of the disclosure may be applicable to any wireless standard including IEEE 802.15.4q standard. The methods and apparatuses according one or more example embodiments of the disclosure may utilize information of sampling rate for estimating the CFO. With the methods and apparatuses according one or more example embodiments of the disclosure, the range of estimable CFO's may be extended to large magnitudes. For example, in case of IEEE 802.15.4q standard, CFO's in the range up to 4 MHz (i.e., −4 MHz to +4 MHz) could be estimated using the methods and apparatuses according one or more example embodiments of the disclosure. The methods and apparatuses according one or more example embodiments of the disclosure may be implemented with smaller variations or can be extended for better performance.

The methods and apparatuses according one or more example embodiments of the disclosure may provide a mechanism for reliability improvement of the coarse angle based on full preamble angle $\varphi\_T$. It should be noted that many of the digital communications employ many repetitions of a base preamble. Therefore, in the methods and apparatuses according one or more example embodiments of the disclosure, larger angles, for example, $\varphi\_mT$, where 'm' is an integer, may be used to improve the reliability of the fractional angles.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The above and/or other aspects will be more apparent and more readily appreciated from the following description of example embodiments with reference to the accompanying drawings, in which.

DETAILED DESCRIPTION

Hereinafter, various example embodiments will be described with reference to the accompanying drawings. It is to be understood that the content described in the present disclosure should be considered as descriptive and not for the purpose of limitation, and therefore various modifications, equivalents, and/or alternatives of the example embodiments are included in the present disclosure. With reference to descriptions of the accompanying drawings, the same or similar components may be denoted by similar reference numerals.

Descriptions of well-known components and processing techniques may be omitted so as to not unnecessarily obscure the example embodiments herein. Also, the various example embodiments described herein are not necessarily mutually exclusive, as some example embodiments can be combined with one or more other example embodiments to form or illustrate new example embodiments. The terminologies used in this disclosure should be considered as descriptive and not for the purpose of limiting the scope of example embodiments. Further, although the singular representation may be used in the disclosure for convenience of explanation, it may be interpreted as including plural representations unless the context clearly indicates otherwise. The term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

Figure 1:
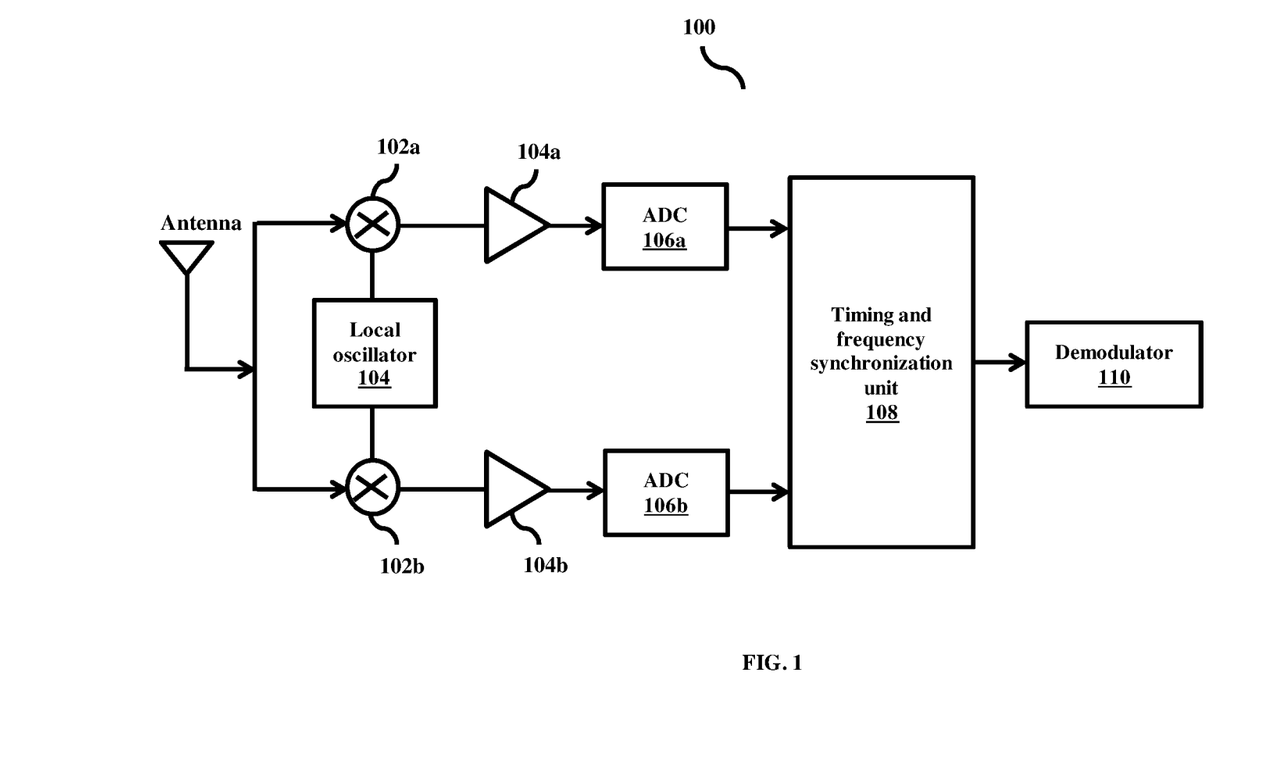
FIG. 1 is a block diagram illustrating various units of a wireless receiver according to an example embodiment.

FIG. 1 is a block diagram illustrating various elements of a wireless receiver 100 according to an example embodiment. The wireless receiver 100 may comply with one of one several standards such as an IEEE 802.15.4 standard, or the Bluetooth Low Energy (BLE) standard. The wireless receiver 100 may be for example, an IEEE 802.15.4q coherent receiver. As depicted in the FIG. 1, the wireless receiver 100 may be coupled to an antenna and includes mixers 102a and 102b, local oscillator 104, amplifiers 104a and 104b, analog-to-digital converters (ADCs) 106a and 106b, timing and frequency synchronization unit 108 and a demodulator 110.

According to an example embodiment, a radio frequency (RF) signal received at the antenna is split and provided to the mixers 102a and 102b where the received signal is mixed with the local oscillator signal to produce in-phase (I) and quadrature (Q) components. The I and Q signals will then follow two paths to timing and frequency synchronization unit 108. The I and Q components are amplified by the amplifiers 104a and 104b and converted to digital signals using the ADCs 106a and 106b. According to an example embodiment, the I component follow a first path, which includes mixer 102a, amplifier 104a and ADC 106a, and the Q component follow a second path, which includes mixer 102b, amplifier 104b and ADC 106b. The timing and frequency synchronization unit 108 provides symbol/chip synchronization and frequency/phase adjustment. The timing and frequency synchronization unit 108 includes various elements (as described in the FIG. 2) for performing correlation as well as preamble detection and CFO estimation. The timing and frequency synchronization unit 110 includes storage (i.e., a buffer or other types of storage components) for storing various values such as a plurality of candidate CFO values that are used to calculate a CFO estimate. The timing and frequency synchronization unit 108 estimates the CFO with timing synchronization. The CFO estimation with timing synchronization will be discussed in more detail in the later parts of the description. According to an example embodiment, the preamble may be detected by taking a mean, or average, of multiple correlation peak values. The correlated values are used for the timing and frequency synchronization. The demodulator 110 may be, for example, a O-QPSK demodulator. The type of demodulation depends in part on the applicable standard.

Figure 2:
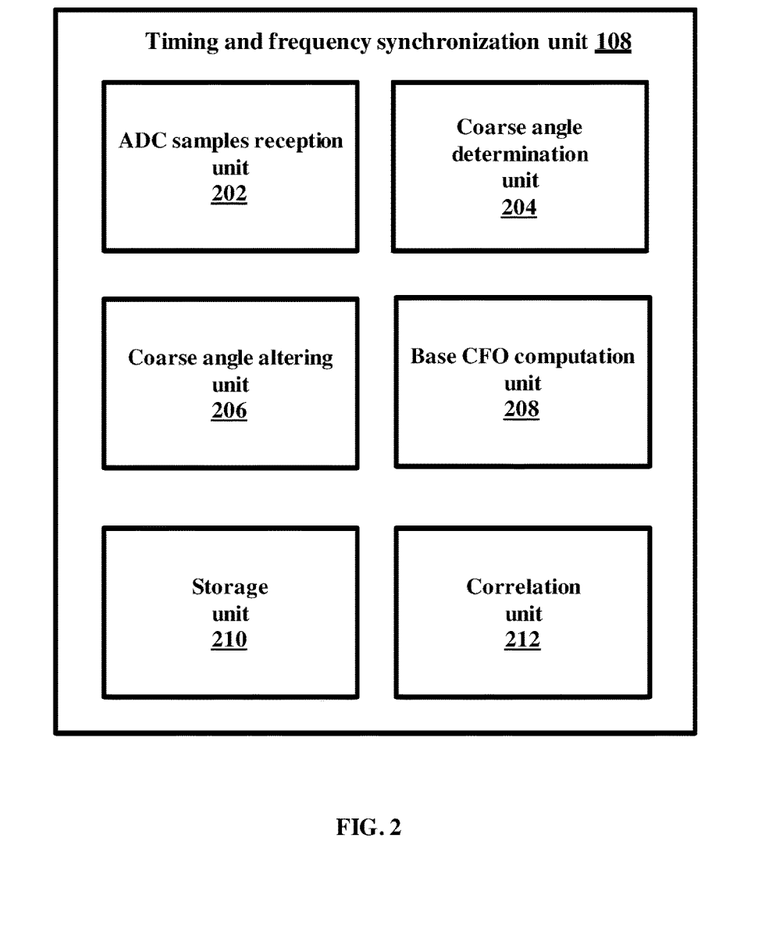
FIG. 2 is a block diagram illustrating various units of a timing and frequency synchronization unit in the wireless receiver according to an example embodiment.

FIG. 2 is a block diagram illustrating various units of timing and frequency synchronization unit 108 in the wireless receiver 100 according to an example embodiment. As depicted in the FIG. 2, the timing and frequency synchronization unit 108 includes an ADC samples reception unit 202, a coarse angle determination unit 204, a coarse angle altering unit 206, a base CFO estimation unit 208, a storage unit 210 and a correlation unit 212.

The ADC samples reception unit 202 receives ADC samples from the ADCs 106a and 106b. The received ADC samples may be constant envelope phase modulated signals. The vector of the received ADC samples may be represented as $r_{samp}$ with each element denoted as $r_{samp}(n)$.

The coarse angle determination unit 204 determines the coarse angle between two ADC samples separated by predetermined time duration. In this context, the predetermined time duration could be equal to the sampling period $T_s$ or a multiple of sampling period, i.e., equal to $mT_s$, m is an integer. The coarse angle $\varphi_s$ can be determined using the equation (1) as mentioned below.

$$\varphi_s = \angle(r_{samp}(n) \cdot r_{samp}^*(n+1)) \tag{1}$$

The reliability of the coarse angle as determined using the equation (1) is low and hence the coarse angle can be referred as coarse fractional angle. According to an example embodiment, the coarse angle is altered to obtain an improved coarse angle.

The coarse angle altering unit 206 alters the coarse angle based on the preamble duration to obtain an improved coarse angle. The coarse angle corresponding to the full preamble duration, which corresponds to a preamble length 'P', denotes the angle of maximum reliability and is represented by the equation (2) as mentioned below.

$$\varphi_T = \angle(r_{samp}(n) \cdot r_{samp}^*(n+P*OSR)) \tag{2}$$

The relation between the coarse fractional angle $\varphi_s$ (as mentioned in the equation (1)) and the angle $\varphi_T$ (as mentioned in the equation (2)) can be denoted as $$\varphi_T + 2n\pi = N\varphi_s \tag{3}$$

In the above equation (3), N is the ratio of T and the predetermined time duration described above. As mentioned above, digital communications may employ many repetitions of a base preamble. In that case, the coarse angle may correspond to the multiples of full preamble duration and the predetermined time duration should be selected such that N is an integer. In the presence of noise, the equation (3) may not be valid. The accuracy of coarse fractional angle $\varphi_s$ may be improved by obtaining $\varphi_s'$ represented as $$\varphi_s' = \frac{\varphi_T + 2n_0\pi}{N} \tag{4}$$

In the equation (4), $n_0$=round(n) and $$n = \frac{N\varphi_T - \varphi_s}{2\pi} \tag{5}$$

The above method is based on the fact that, since equation (3) should hold with equality and n is an integer, the reliability of the $\varphi_s$ improves by rounding of the non-integer (n is non-integer in presence of noise/channel effects) n in the equation (5) to its nearest integers.

The base CFO estimation unit 208 estimates the base CFO from the improved coarse angle $\varphi_s'$. The base CFO ($\delta f'$) is estimated using the equation (6) as mentioned below.

$$\delta f' = \frac{\varphi_s'}{2\pi T_s} \tag{6}$$

The storage unit 210 stores various values such as a base CFO estimate, a difference frequency, a plurality of candidate CFO values that are used to calculate the CFO. The storage unit 210 may include one or more computer-readable storage media. The storage unit 210 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 210 may, in some examples, be considered a non-transitory storage medium. The term "non-transitory" may indicate that the storage medium is not embodied in a carrier wave or a propagated signal. However, the term "non-transitory" should not be interpreted that the storage unit 210 is non-movable. In some examples, the storage unit 210 can be configured to store larger amounts of information. In certain examples, a non-transitory storage medium may store data that can, over time, change (e.g., in Random Access Memory (RAM) or cache).

The correlation unit 212 performs one or more actions for performing correlation, CFO estimation and timing synchronization. The correlation unit 212 computes a plurality of candidate CFOs using the base CFO estimate and a difference frequency.

From the base CFO estimate $\delta f'$, the plurality of candidate CFOs ($\delta f^h$) can be computed using the equation (7) as mentioned below.

$$\delta f^h = \delta f' + h f_d, \; h \in \{-m, -m+1, \ldots, 0, \ldots m-1, m+1\} \tag{7}$$

In the above equation (7), 'm' is an integer that determines the estimation accuracy and $f_d$ denotes the difference-frequency. The difference frequency is a reciprocal of product of preamble period and the sampling period.

The difference frequency ($f_d$) is obtained as $$f_d = \frac{1}{2\pi T_s} \cdot \frac{2\pi}{N} \qquad (8)$$

Further, the correlation unit 212 estimates the CFO and the timing synchronization using the computed plurality of candidate CFOs. The various actions performed by the correlation unit 212 for estimating the CFO and the timing synchronization are described in conjunction with FIG. 4 according to an example embodiment.

The FIG. 2 shows exemplary units of the wireless receiver 100 but it is to be understood that other embodiments are not limited thereon. In other embodiments, the wireless receiver 100 may include less or more number of units. Further, the labels or names of the units are used only for illustrative purpose and does not limit the scope of the disclosure. One or more units can be combined together to perform same or substantially similar function in the wireless receiver 100.

Figure 3:
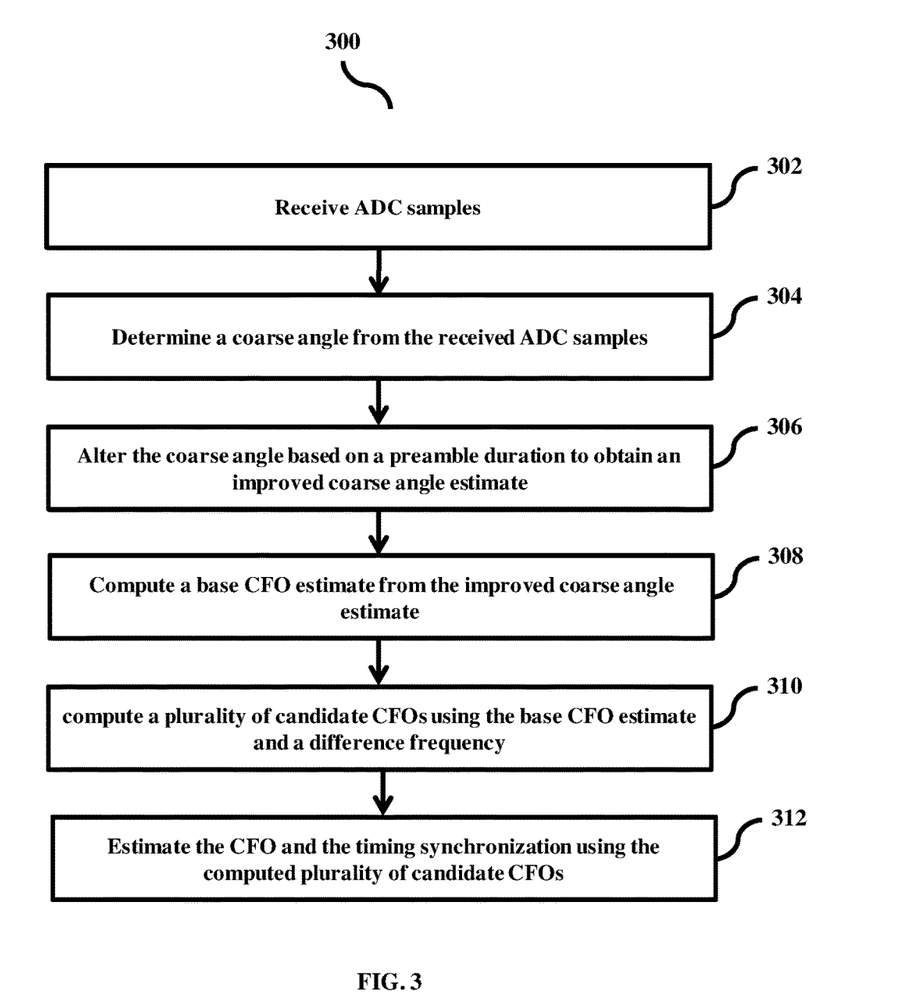
FIG. 3 is a flow diagram illustrating a method for estimating carrier frequency offset (CFO) with timing synchronization in a wireless receiver according to an example embodiment.

FIG. 3 is a flow diagram 300 illustrating a method for estimating the CFO with timing synchronization in a wireless receiver according to an example embodiment. At operation 302, the method includes receiving the ADC samples. The method allows the ADC samples reception unit 202 to receive the ADC samples. In an embodiment, the received ADC samples may be constant envelope phase modulated signals.

At operation 304, the method includes determining a coarse angle from the received ADC samples. The method allows the coarse angle determination unit 204 to determine the coarse angle from the received ADC samples separated by a predetermined time duration. The predetermined time duration could be equal to the sampling period $T_s$ or a multiple of sampling period, i.e., equal to $mT_s$, m is an integer. The coarse angle $\varphi_s$ can be determined using the equation (1) as mentioned above.

At operation 306, the method includes altering the coarse angle based on the preamble duration to obtain an improved coarse angle. The method allows the coarse angle altering unit 206 to alter the coarse angle based on the preamble duration to obtain the improved coarse angle. The coarse angle corresponding to the full preamble duration, which corresponds to a preamble length 'P', is the angle of maximum reliability that can be derived using the equation (2). In an embodiment, the preamble duration can be a pre-defined value. In the equation (3), 'N' is the ratio of T and the predetermined time duration described earlier. As described earlier, the digital communications typically employ many repetitions of a base preamble. In that case, the coarse angle may correspond to the multiples of full preamble duration and the predetermined time duration should be selected such that N is an integer.

At operation 308, the method includes computing a base CFO estimate from the improved coarse angle. The method allows the base CFO estimation unit 208 to compute the base CFO estimate from the improved coarse angle. The base CFO estimation unit 208 computes the base CFO estimate using the equation (6).

At operation 310, the method includes computing a plurality of candidate CFOs using the base CFO estimate and a difference frequency. The method allows the correlation unit 212 to compute the plurality of candidate CFOs using the base CFO estimate and the difference frequency. The plurality of candidate CFOs are computed using the base CFO estimate and the difference frequency with the equation (7) as described above.

At operation 312, the method includes estimating the CFO and the timing synchronization using the computed plurality of candidate CFOs. The method allows the correlation unit 212 to estimate the CFO and the timing synchronization using the computed plurality of candidate CFOs.

The various actions, acts, blocks, operations, or the like in the flow diagram 300 may be performed in the order presented, in a different order or simultaneously. Further, in some example embodiments, some of the actions, acts, blocks, operations, or the like may be omitted, added, modified, skipped, or the like without departing from the scope of the disclosure.

Figure 4:
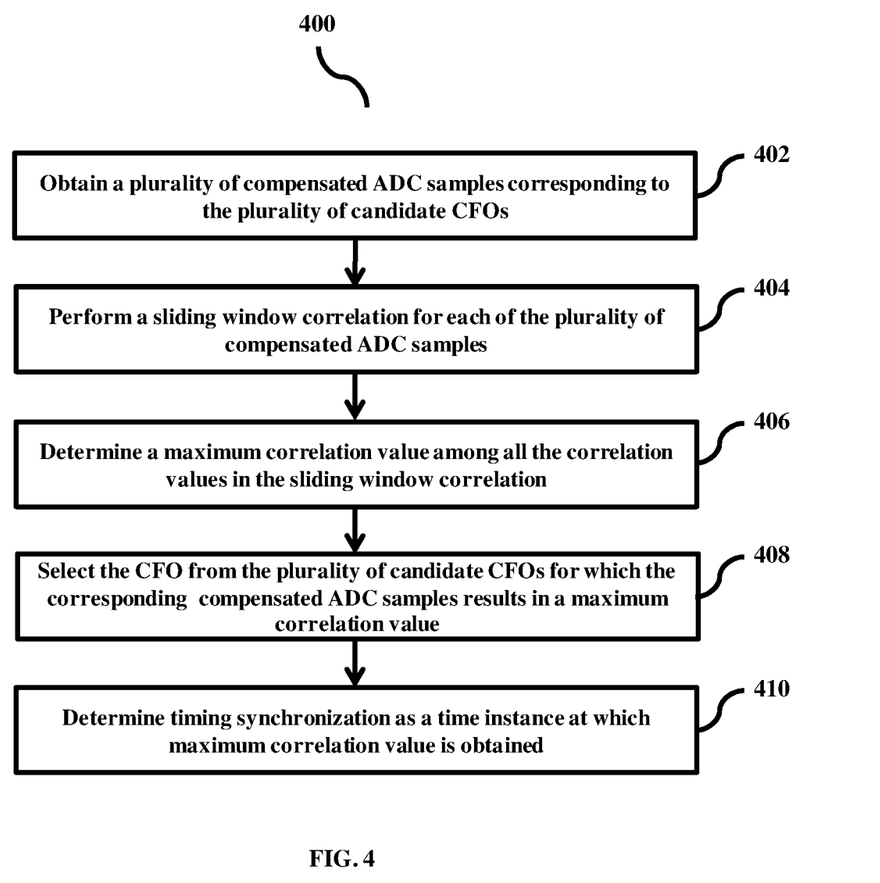
FIG. 4 is a flow diagram illustrating a method for estimating the CFO and the timing synchronization using a computed plurality of candidate CFOs according to an example embodiment.

FIG. 4 is a flow diagram 400 illustrating a method for estimating the CFO and the timing synchronization using a computed plurality of candidate CFOs according to example embodiment. At operation 402, the method includes obtain a plurality of compensated ADC samples corresponding to the plurality of candidate CFOs. The method allows the correlation unit 212 to obtain the plurality of compensated ADC samples corresponding to the plurality of candidate CFOs.

In an example, considering m=2 in the equation (7), five candidate CFO's (i.e., $\delta f^h$, $h \in [-2,2]$) are determined. Using the five candidate CFO's, five compensated ADC samples are obtained using the equation (9) as mentioned below.

$$r_{\delta f^h}(n) = r_{samp}(n) e^{-j*2\pi*\delta f^h * n}, h \in [-2,2] \qquad (9)$$

At operation 404, the method includes performing a sliding window correlation for each of the plurality of compensated ADC samples. The method allows the correlation unit 212 to perform the sliding window correlation for each of the plurality of compensated ADC samples, in which a L-length window of the compensated vector is correlated with the oversampled preamble sequence $x_p^{os}(n)$. The sliding window correlation is performed for each of the compensated ADC samples with the equation (10) as mentioned below.

$$\mathrm{maxcorr}_{\delta f^h}(k) = \Sigma_{n=1}^L r_{\delta f^h}(k+n) \cdot x_p^{os}(n), h \in [-2,2] \qquad (10)$$

In the above equation (10), the number of samples 'L' is equal to the length of oversampled preamble sequence and corresponds to the preamble period T.

At operation 406, the method includes determining a maximum correlation value among all the correlation values in the sliding window correlation. The method allows the correlation unit 212 to determine the maximum correlation value among all the correlation values in the sliding window correlation. In this context, the number of correlation obtained or alternatively the range of 'k' in equation (10) is predetermined and corresponds to duration in the ADC samples wherein the preamble is expected and is specific to the implementation. At operation 408, the method includes selecting the CFO from the plurality of candidate CFOs for which the corresponding compensated ADC samples results in a maximum correlation value. The method allows the correlation unit 212 to select the CFO from the plurality of candidate CFOs for which the corresponding compensated ADC samples results in a maximum correlation value. The CFO (represented as $\delta f$) is selected from the plurality of candidate CFOs, for which the corresponding compensated ADC samples results in a maximum correlation value is obtained can be denoted as $$\delta f = \mathrm{argmax}_{\delta f^h, h \in [-2,2]} \{\mathrm{maxcorr}_{\delta f^h}(k)\} \qquad (11)$$

At operation 410, the method includes determining timing synchronization as a time instance at which maximum correlation value is obtained. The method allows the correlation unit 212 to determine the timing synchronization as the time instance at which maximum correlation value is obtained. The time instance is denoted as "τ". The time instance at which the maximum correlation value is obtained can be derived through the equation (12) as mentioned below.

$$\tau = \text{argmax}_k \{\text{maxcorr}_{\delta_j}(k)\} \quad (12)$$

The various actions, acts, blocks, operations, or the like in the flow diagram 400 may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
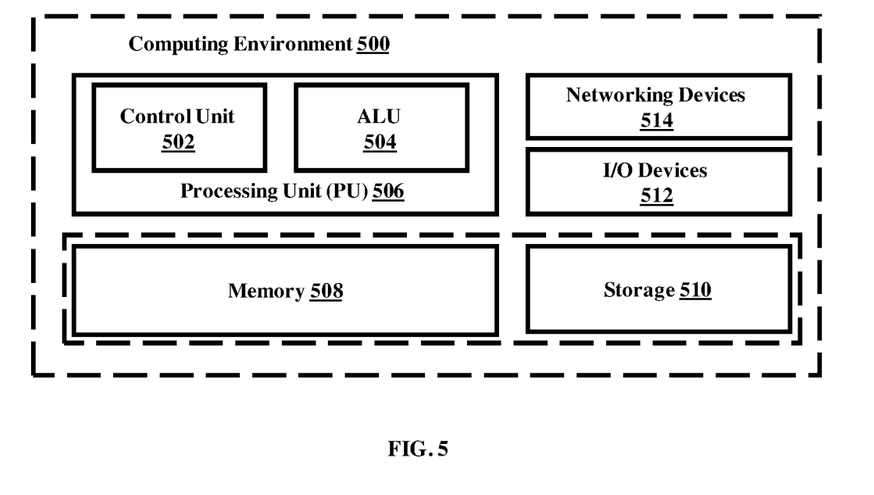
FIG. 5 is computing environment implementing the method for estimating the CFO and the timing synchronization according to an example embodiment.

FIG. 5 is computing environment implementing the method for estimating the CFO and the timing synchronization according to an example embodiment. According to an example embodiment, the methods illustrated in FIG. 3 or 4 may be implemented by the computing environment illustrated in FIG. 5. As depicted in the FIG. 5, the computing environment 500 includes at least one processing unit 506 that is equipped with a control unit 502 and an Arithmetic Logic Unit (ALU) 504, a memory 508, a storage unit 510, plurality of networking devices 514 and a plurality of Input output (I/O) devices 512. The processing unit 506 is responsible for processing the instructions of the algorithm. The processing unit 506 receives commands from the control unit 502 in order to perform its processing. Further, any logical and arithmetic operations involved in the execution of the instructions are computed with the help of the ALU 504.

The overall computing environment 500 can be composed of multiple homogeneous and/or heterogeneous cores, multiple CPUs of different kinds, special media and other accelerators. The processing unit 506 is responsible for processing the instructions of the algorithm. Further, the plurality of processing units 506 may be located on a single chip or over multiple chips.

The algorithm composed of instructions and codes required for the implementation are stored in either the memory unit 508 or the storage 510 or both. According to an example embodiment, the methods illustrated in FIG. 3 or 4 may be algorithm composed of instructions and codes required for the implementation. At the time of execution, the instructions may be fetched from the corresponding memory 508 or storage 510, and executed by the processing unit 506.

In case of any hardware implementations various networking devices 514 or external I/O devices 512 may be connected to the computing environment to support the implementation through the networking unit and the I/O device unit 512.

The example embodiments disclosed herein can be implemented through at least one software program running on at least one hardware device and performing network management functions to control the elements. The elements shown in FIG. 1 through 5 include blocks which can be at least one of a hardware device, or a combination of hardware device and software module.

According to an example embodiment, the receiver 100 illustrated in FIG. 1 or the timing and frequency synchronization unit 108 may be implemented by the computing environment 500. According to an example embodiment, one or more units or elements illustrated in FIGS. 1 and/or 2 may be one or more components of one or more hardware processors, including but not limited to homogeneous and/or heterogeneous cores, or one or more CPUs of different kinds. According to another example embodiment, one or more units or elements illustrated in FIG. 1 or 2 may be software components implemented or executed by one or more hardware processors, including but not limited to homogeneous and/or heterogeneous cores, or one or more CPUs of different kinds.

According to an example embodiment, a non-transitory computer readable medium in which a program performing the methods at least illustrated in FIG. 3 or 4 above may be provided. According to an example embodiment, the non-transitory computer readable medium may include a medium that semi-permanently stores data therein and is readable by a device. In detail, various applications and programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although example embodiments have been illustrated and described hereinabove, the present disclosure is not limited to the above-mentioned specific example embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:

1. A method for estimating carrier frequency offset (CFO) with timing synchronization in a wireless receiver, the method comprising:
   receiving analog-to-digital converter (ADC) samples;
   determining a coarse angle from the received ADC samples based on an angle between two ADC samples separated by a predetermined time duration;
   obtaining an improved coarse angle by altering the determined coarse angle based on a ratio of a full preamble duration and the predetermined time duration;
   determining a base CFO estimate based on the improved coarse angle;
   determining a plurality of candidate CFOs based on the base CFO estimate and a difference frequency; and
   determining the CFO and the timing synchronization using the plurality of candidate CFOs.

2. The method of claim 1, wherein the preamble duration is a predefined value.

3. The method of claim 1, wherein the difference frequency is a reciprocal of a product of a preamble period and a sampling period.

4. The method of claim 1, wherein determining the CFO and the timing synchronization using the plurality of candidate CFOs comprises:
   obtaining a plurality of compensated ADC samples corresponding to the plurality of candidate CFOs, after compensating the received ADC samples with the plurality of candidate CFOs;
   performing a sliding window correlation for each of the plurality of compensated ADC samples with a oversampled preamble sequence; and
   determining a maximum correlation value among correlation values in the sliding window correlation for each of the plurality of compensated ADC samples.

5. The method of claim 4, wherein a candidate CFO, from among the plurality of candidate CFOs, having the maximum correlation value is estimated as the CFO.

6. The method of claim 4, wherein a time instance at which the maximum correlation value is obtained is determined as the timing synchronization.

7. The method of claim 1, wherein the receiving the analog-to-digital converter (ADC) samples comprises:
receiving first ADC samples from a first ADC converter; and
receiving second ADC samples from a second ADC converter.

8. The method of claim 7, wherein the determining the coarse angle from the received ADC samples comprises:
determining the coarse angle based on the first ADC samples and the second ADC samples.

9. The method of claim 1, the determining the plurality of candidate CFOs based on the base CFO estimate ($\delta f$) and the difference frequency ($f_d$) comprises:
computing the plurality of candidate CFOs ($\delta f^h$) as follows:

$$\delta f^h = \delta f + h f_d, \; h \in \{-m, -m+1, \ldots, 0, \ldots m-1, m+1\},$$

wherein m is an integer that determines an estimation accuracy.

10. An apparatus comprising:
a processor configured to:
receive analog-to-digital converter (ADC) samples;
determine a coarse angle from the received ADC samples based on an angle between two ADC samples separated by a predetermined time duration;
obtain an improved coarse angle by altering the determined coarse angle based on a ratio of a full preamble duration and the predetermined time duration;
determine a base CFO estimate based on the improved coarse angle;
determine a plurality of candidate CFOs based on the base CFO estimate and a difference frequency; and
determine a CFO and a timing synchronization using the plurality of candidate CFOs.

11. The apparatus of claim 10, wherein the preamble duration is a predefined value.

12. The apparatus of claim 10, wherein the difference frequency is a reciprocal of a product of a preamble period and a sampling period.

13. The apparatus of claim 10, wherein the processor is further configured to estimate the CFO and the timing synchronization using the plurality of candidate CFOs by:
obtaining a plurality of compensated ADC samples corresponding to the plurality of candidate CFOs, after compensating the received ADC samples with the plurality of candidate CFOs;
performing a sliding window correlation for each of the plurality of compensated ADC samples with a oversampled preamble sequence; and
determining a maximum correlation value among all correlation values in the sliding window correlation for each of the plurality of compensated ADC samples.

14. The apparatus of claim 13, wherein a candidate CFO, from among the plurality of candidate CFOs, having the maximum correlation value is estimated as the CFO.

15. The apparatus of claim 13, wherein a time instance at which the maximum correlation value is obtained is determined as the timing synchronization.

16. An apparatus comprising:
a processor configured to:
determine an estimated base carrier frequency offset (CFO) based on an angle between analog-to-digital converter (ADC) samples separated by a predetermined time duration and a ratio of a full preamble duration and the predetermined time duration;
determine a plurality of candidate CFOs based on the estimated base CFO and a difference frequency; and
determine a CFO from the plurality of candidate CFOs based on a correlation value corresponding to each of the plurality of candidate CFOs.

* * * * *